(12) United States Patent
Forestier

(10) Patent No.: US 10,620,412 B2
(45) Date of Patent: Apr. 14, 2020

(54) IR IMAGING SYSTEM WITH CONTINUOUS GC-PC ZOOM PROVIDED WITH A TPC CONFIGURATION

(71) Applicant: THALES, Courbevoie (FR)

(72) Inventor: Bertrand Forestier, Guyancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/339,698

(22) PCT Filed: Oct. 5, 2017

(86) PCT No.: PCT/EP2017/075306
§ 371 (c)(1),
(2) Date: Apr. 4, 2019

(87) PCT Pub. No.: WO2018/065508
PCT Pub. Date: Apr. 12, 2018

(65) Prior Publication Data
US 2019/0285864 A1 Sep. 19, 2019

(30) Foreign Application Priority Data
Oct. 6, 2016 (FR) ...................................... 16 01451

(51) Int. Cl.
*G02B 15/20* (2006.01)
*G02B 5/00* (2006.01)
(Continued)

(52) U.S. Cl.
CPC ............. *G02B 15/20* (2013.01); *G02B 5/006* (2013.01); *G02B 7/008* (2013.01); *G02B 13/14* (2013.01); *H04N 5/23296* (2013.01); *H04N 5/33* (2013.01)

(58) Field of Classification Search
CPC ........ G02B 15/20; G02B 5/006; G02B 7/008; G02B 13/14; H04N 5/23296; H04N 5/33
See application file for complete search history.

(56) References Cited

U.S. PATENT DOCUMENTS

| 7,683,321 B1* | 3/2010 | King | ......................... H04N 5/33 |
| | | | 250/252.1 |
| 2010/0177195 A1* | 7/2010 | Colentier | ............... G02B 7/008 |
| | | | 348/164 |

(Continued)

FOREIGN PATENT DOCUMENTS

| CN | 205 581 385 U | 9/2016 |
| JP | 4-367808 A | 12/1992 |

OTHER PUBLICATIONS

Vizgaitis, "Dual f/number optics for 3rd generation FLIR systems", Proceedings of the SPIE, vol. 5783, pp. 875-886 (2005).
(Continued)

*Primary Examiner* — Thai Q Tran
*Assistant Examiner* — Sunghyoun Park
(74) *Attorney, Agent, or Firm* — Baker & Hostetler LLP

(57) ABSTRACT

A passive IR imaging system with a matrix-array detector in a cryostat includes a cold diaphragm, an image-forming device, of focal length that is continuously variable between $F_{GC}$ and $F_{PC}$ with, in this range of focal lengths, a constant numerical aperture and an aperture diaphragm level with the cold diaphragm, comprising a head group of fixed position and constant focal length with at least one lens in a mechanical holding means by the PC configuration, a first group and second group that are movable and positioned in order to ensure the change of focal length between and the focus of the image, an image-transport group of fixed position and of constant magnification, able to image the aperture diaphragm in order to limit the diameter of the PC useful beams on the lenses of the head group. The device comprises a TPC configuration with the first and second movable groups positioned to obtain the focal length $F_{TPC}$, and its aperture diaphragm embodied in the mechanical holding means.

7 Claims, 4 Drawing Sheets

(51) Int. Cl.
*G02B 13/14* (2006.01)
*H04N 5/232* (2006.01)
*G02B 7/00* (2006.01)
*H04N 5/33* (2006.01)

(56) References Cited

U.S. PATENT DOCUMENTS

2011/0169962 A1* 7/2011 Gat .................. H04N 5/33
 348/164
2014/0111651 A1* 4/2014 Druart ............... G02B 3/08
 348/164

OTHER PUBLICATIONS

Fritze, et al., "New Thermal Imager for Long Range Surveillance", AMA Conferences 2013, pp. 43-47, 2013.

* cited by examiner

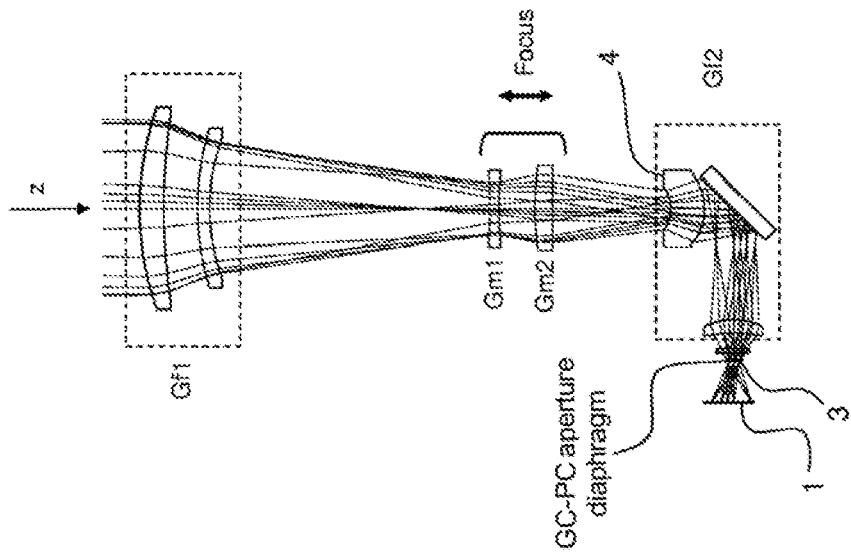
FIG.1B : PC
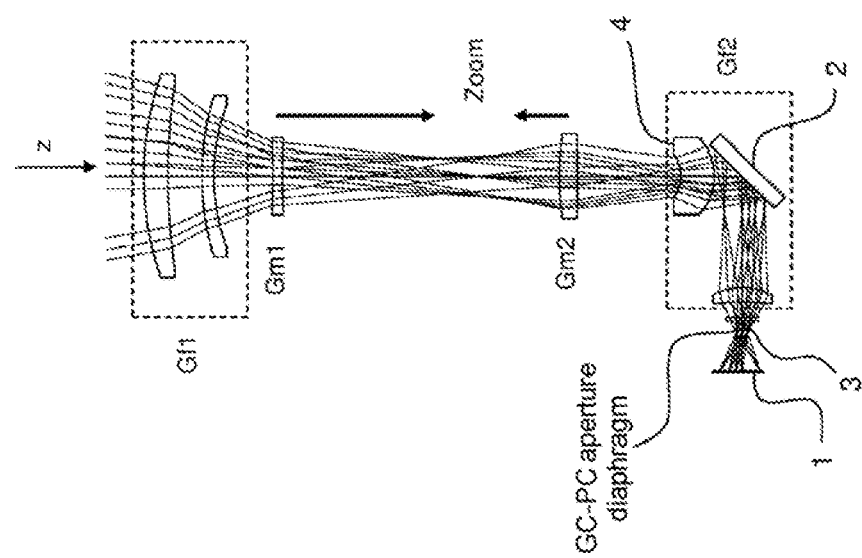
FIG.1A : GC

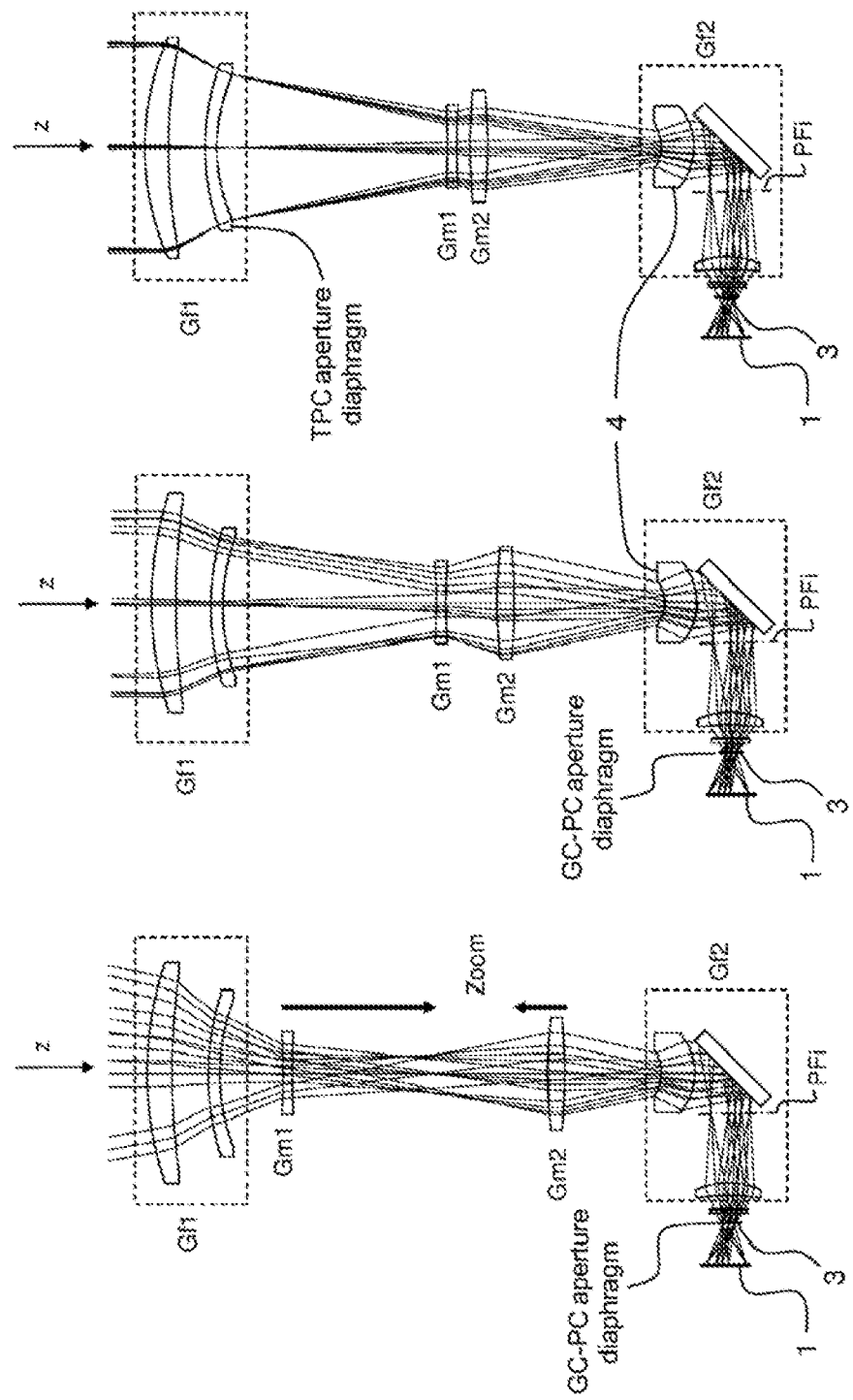

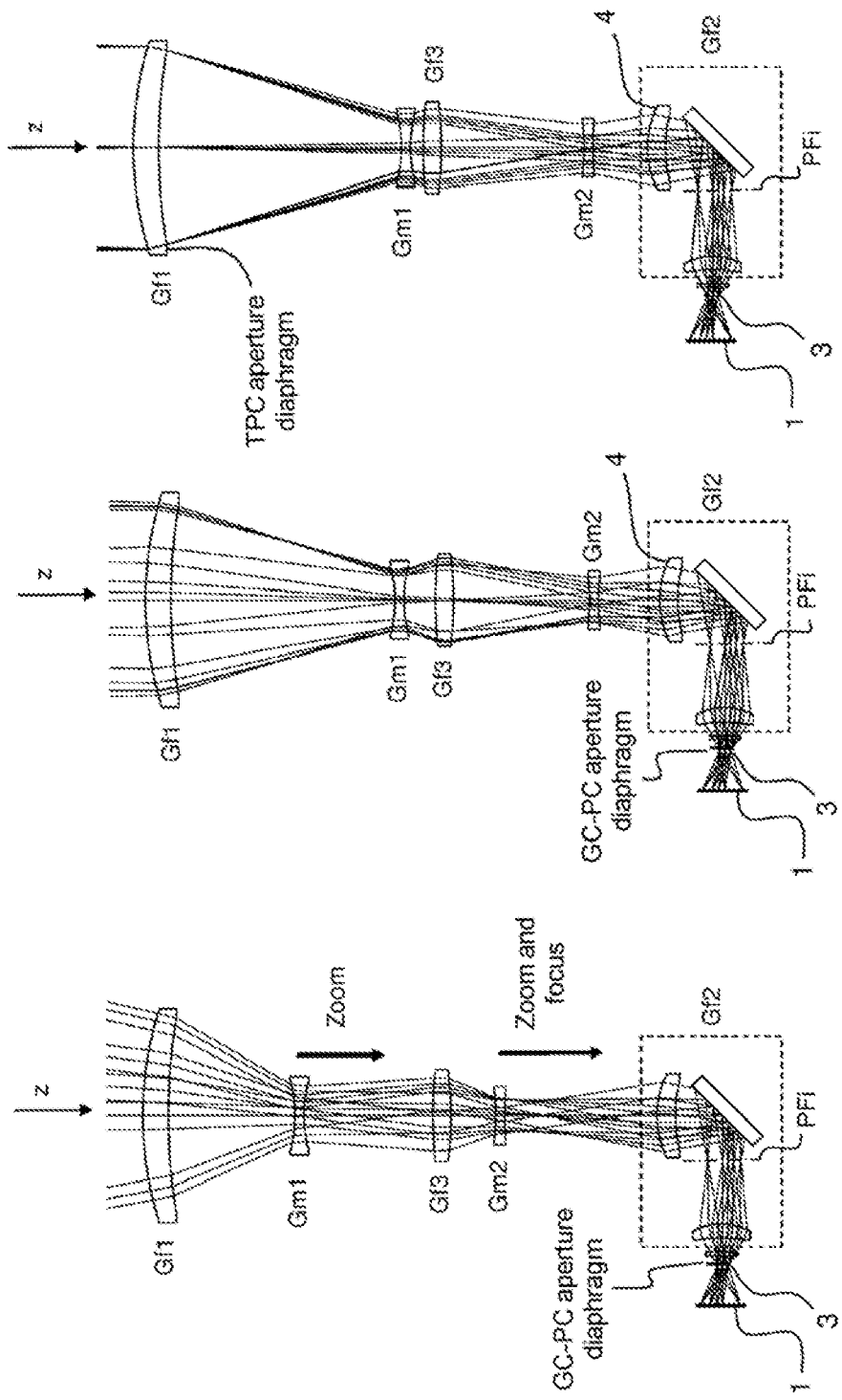

IR IMAGING SYSTEM WITH CONTINUOUS GC-PC ZOOM PROVIDED WITH A TPC CONFIGURATION

CROSS-REFERENCE TO RELATED APPLICATIONS

This application is a National Stage of International patent application PCT/EP2017/075306, filed on Oct. 5, 2017, which claims priority to foreign French patent application No. FR 1601451, filed on Oct. 6, 2016, the disclosures of which are incorporated by reference in their entirety.

FIELD OF THE INVENTION

The field of the invention is that of a passive infrared imaging system such as for example thermal binoculars and cameras, operating in the MWIR band (3-5 µm) and/or in the LWIR band (8-12 µm), using a cooled detector and an opto-mechanical device for forming images of variable focal length i.e. what is also called an optical zoom.

BACKGROUND

In order to optimize the range, cost and ergonomics of such a system, it is desired to provide a continuous GC-PC zoom equipped with an optical TPC configuration, with a PC/TPC ratio of class 1.5, without the TPC configuration increasing the weight, bulk or cost of the system (GC being the acronym of the French expression grand champ meaning "large field", PC being the acronym of the French expression petit champ meaning "small field" and TPC being the acronym of the French expression trés petit champ meaning "very small field").

Continuous single-aperture IR zooms with no structural flux do currently exist.

Commercially available IR systems, such as for example the Sophie ZS or Sophie XF binoculars from THALES Optronics, are currently equipped with continuous GC-PC zooms of this type that have a an average ratio (typically of about 6). Conventionally, such a zoom, as shown in FIGS. 1A and 1B, comprises in order on the optical axis z of the system:

A fixed head group Gf1 of focal length F1, of telephoto type (a priori).

A divergent movable group Gm1 playing the role of variator, which works with a negative variable magnification gm1.

A convergent movable group Gm2 playing the role of compensator, which works with a variable magnification gm2 that is also negative.

A fixed group Gf2 that relays, to the detector, the real intermediate image delivered by the three groups Gf1, Gm1 and Gm2. The group Gf2 works with a constant and negative magnification gf2 that is generally comprised between −2 and −1.

A folding mirror 2 is placed in the group Gf2 in order to optimize bulk.

The exit pupil of the system coincides with the cold diaphragm 3 of the detector 1, which plays the role of aperture diaphragm of the zoom in the continuous GC-PC range. Using a field lens 4 generally present in the group Gf2, it is possible to constrain the position and the aberrations of the entrance pupil of the PC, in order to minimize the diameters of the components of the head group Gf1, which add significantly to the cost of the optic. In GC, most often the entrance pupil is virtual and thus the beams remain in the interior of the envelope of the useful PC beams.

The focal length F of the zoom is expressed by $F=F1 \cdot gm1 \cdot gm2 \cdot gf2$. The variation in focal length, in other words the zoom effect, is due to variations in the product $gm1 \cdot gm2$, which is minimum in GC and maximum in PC.

The assembly is optimized so that in PC, the absolute value of gm2 (also denoted |gm2|) remains lower than about 0.85. It is known that this condition makes it possible to use the compensator (Gm2) as focal group for the entirety of the continuous GC-PC range. Specifically, the axial sensitivity of the compensator Gm2, which relates the defocus of the image and the axial movement of the compensator, is expressed by $(1-(gm2)^2)(gf2)^2$.

Therefore, if |gm2| is sufficiently far from 1.0, then a small axial movement of the tandem induces a defocus of the image; in other words Gm2 made play the role of near focal group or may serve to compensate the thermal drifts of the combination.

Likewise, if the product $gm1 \cdot gm2$ remains below about 0.85 in PC configuration, then it is possible to use the tandem Gm1-Gm2 as focal group in the entirety of the GC-PC range.

Of course, with this type of optical architecture it is possible to obtain a continuous zoom of higher ratio, in order to cover a GC-TPC need. Grosso-modo, the diameter of the head components is then multiplied by a factor equal to the PC/TPC ratio, this having a substantial impact on the bulk and cost of the equipment.

Another known solution consists in using a bi-aperture GC-TPC infrared zoom with no structural flux. It has been seen that the elongation of the focal length of a zoom to obtain a TPC is naturally accompanied by an increase in the useful diameter of the head components, and therefore by an additional cost. Nevertheless, it is possible to limit the diameter of the frontal lens (head lens of the head group) while guaranteeing a perfectly healthy photometric behavior. To do this, the useful aperture in TPC is decreased by inserting in front of the cryostat a diaphragm boarded by a mirror for decreasing structural flux. Such a device is more precisely described in § 5 of the article by J. Vizgaitis: Dual F/number optics for 3rd generation FLIR systems, Proc. Of SPIE Vol. 5783. It is for example found in the ATTICA M-ER camera of the company AIRBUS Defense & Space, which is described in the article "New Thermal Imager for Long Range Surveillance" by J. Fritze & H. Schlemmer, AMA Conferences 2013. Such a solution solves only partially the stated problem in so far as it employs a mechanism dedicated to switching the TPC aperture diaphragm, this obviously not being very economical.

It is also possible to add an afocal TPC in front of a GC-PC zoom. Specifically, to obtain a TPC from a GC-PC zoom, it is enough to mount a PC/TPC magnifying afocal module in front of the head group of the zoom. On so doing, the GC is also decreased by a factor PC/TPC. Such an afocal system, of Galilean type, comprises at least two IR components of large diameter, which are a priori expensive. This solution absolutely does not solve the stated problem, neither in terms of weight and bulk, nor in terms of cost, nor in terms of ergonomics.

Therefore, there remains to this day a need for an IR imaging system that simultaneously meets all of the aforementioned requirements, in terms of weight, bulk, cost, and ergonomics.

SUMMARY OF THE INVENTION

The system according to the invention uses an infrared zoom comprising two movable groups, having a continuous GC-PC range and equipped with an additional TPC configuration. This zoom has the following features:

The continuous range operates conventionally, its aperture diaphragm being coincident with the cold screen of the cryostat.

The TPC configuration, which is original, operates with a useful numerical aperture smaller than that of the GC-PC range and with a relatively high proportion of structural flux, because said flux is not small. The aperture diaphragm of the TPC is formed with the assistance of one of the lenses of the head group of the zoom, and is imaged in the vicinity of the cold screen. There is no mechanism dedicated to the change of aperture.

More precisely, one subject of the invention is a passive IR imaging system that comprises, on its optical axis:

a matrix-array detector placed in a cryostat comprising a cold diaphragm, an optical device for forming images on the detector, having a focal length that is continuously variable between a GC configuration of focal length $F_{GC}$ and a PC configuration of focal length $F_{PC}$, with, in said range of focal lengths, a constant numerical aperture and an aperture diaphragm coinciding with the cold diaphragm of the cryostat, this optical device comprising:

a convergent head group of fixed position and constant focal length comprising at least one lens mounted in a mechanical holding means, of diameter determined by the PC configuration, a first movable group and second movable group that are able to be positioned in order to ensure the change of focal length between $F_{GC}$ and $F_{PC}$ and the focus of the image on the detector, an image-transport group of fixed position and of constant magnification, able to image the aperture diaphragm in order to limit the diameter of the envelope of the PC useful beams on the lenses of the head group.

It is mainly characterized in that the optical device comprises a TPC configuration of preset focal length $F_{TPC}$, with the first and second movable groups able to be positioned to obtain the focal length $F_{TPC}$, and its aperture diagram embodied in the mechanical holding means of the head group.

The imaging system according to the invention is thus equipped with a continuous cold-pupil GC-PC zoom equipped with an additional TPC configuration operating in a small-aperture mode with a hot pupil embodied in the head group and imaged in the vicinity of the cold pupil of the continuous zoom.

The zoom comprises two movable groups that ensure both the change of field and the focus of the image on the detector.

The zoom is essentially dimensioned for the continuous GC-PC function, and there is no mechanism nor opto-mechanical module exclusively dedicated to the TPC.

The optical components are not over-dimensioned for the needs of the TPC function.

The TPC constrains no more the variator and compensator mechanisms than the GC-PC zoom; in particular, it is not necessary to improve their resolutions for the TPC.

According to a first embodiment, the two movable groups are adjacent, the first movable group is divergent with a negative variable magnification, and the second movable group convergent with a variable magnification that is also negative. When the GC configuration corresponds to 20°, the PC configuration to 3°, and the TPC configuration to 2°, the product of the magnifications of the first and second movable groups is typically higher than 1.2 in TPC configuration, comprised between 0.8 and 0.85 in PC configuration and higher than 0.12 in GC configuration.

According to a second embodiment, the imaging system comprises an additional convergent fixed group with a negative variable magnification, located between the two divergent movable groups that have a negative variable magnification. When the GC configuration corresponds to 20°, the PC configuration to 3°, and the TPC configuration to 2°, the image-transport group works with a constant magnification of low absolute value, typically lower than 0.1.

Other subjects of the invention are a cooled IR camera or a pair of cooled IR binoculars comprising a passive IR imaging system such as described.

BRIEF DESCRIPTION OF THE DRAWINGS

Other features and advantages of the invention will become apparent on reading the following detailed description, which is given by way of nonlimiting example with reference to the appended drawings, in which:

FIGS. 1a and 1b, which have already been described, schematically show seen in cross section an IR imaging system according to the prior art, in GC configuration (FIG. 1a) and PC configuration (FIG. 1b), FIGS. 2a to 2c schematically show seen in cross section a first example of an IR imaging system according to the invention, in GC configuration (FIG. 2a), PC configuration (FIG. 2b) and TPC configuration (FIG. 2c), FIGS. 3a to 3c schematically show seen in cross section a second example of an IR imaging system according to the invention, in GC configuration (FIG. 3a), PC configuration (FIG. 3b) and TPC configuration (FIG. 3c)

Figure 4:
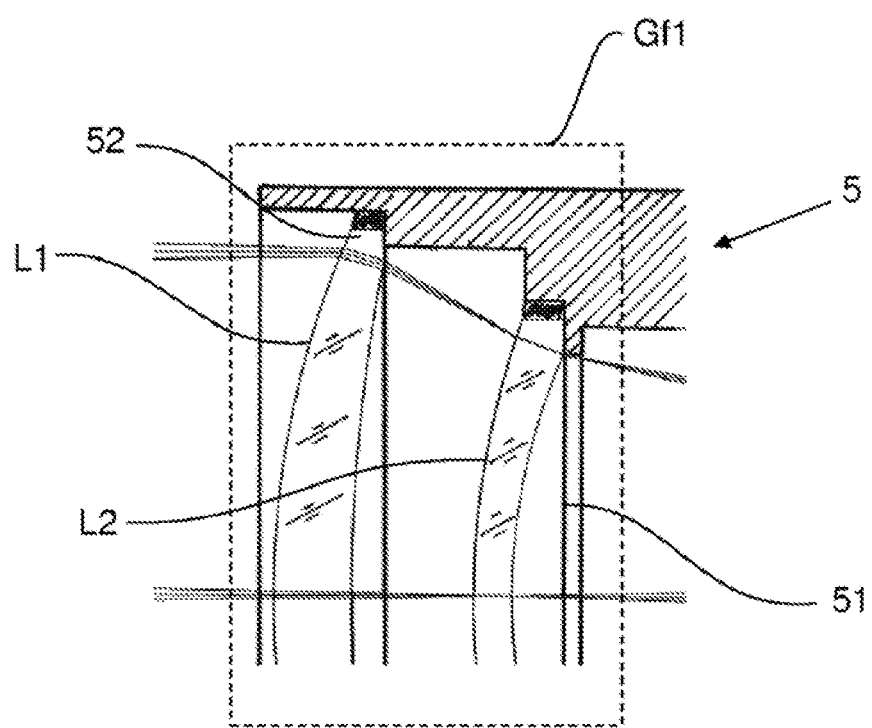
FIG. 4 shows an example of a mechanical holding means of the head group.

In all the figures, elements that are the same have been referenced with the same references.

DETAILED DESCRIPTION

As shown in the two examples of FIGS. 2a to 2c and 3a to 3c, the IR imaging system according to the invention comprises, on its optical axis z:

a matrix-array detector 1 comprising a cold screen, an optical device for forming images on the detector, having a focal length that is continuously variable between the GC configuration and the PC configuration and operating without vignetting with a constant aperture number N. The current focal length of the zoom is denoted F, its focal length in GC configuration is denoted $F_{GC}$, and its focal length in PC configuration is denoted $F_{PC}$.

in the continuous GC-PC range, an aperture diaphragm located level with the cold diaphragm 3 of the cryostat in order to optimize the noise equivalent temperature difference (NETD) of the system. More rarely, the aperture diaphragm is placed just upstream of the cryostat encapsulating the detector 1, and is bordered by a flux-decreasing mirror so as to achieve a pseudo cold pupil, and guarantee a healthy photometry. In the two aforementioned cases, the zoom operates with a very low level of structural flux, this allowing the performance of the imaging system to be maximized while facilitating corrections of image nonuniformities. If it is managed to control the variations in the residual structural flux (essentially the Narcissus effect) during zooming, it is possible to correct induced image non-uniformities with a single gain table valid for all the focal lengths of the GC-PC range, and a limited number of offset tables.

The optical device comprises in order on the optical axis z:

a convergent head group Gf1 of fixed position and of fixed focal length F1, the one or more lenses of which are mounted in a mechanical holding means 5, one example of which is shown in FIG. 4 for 2 lenses, 2 movable groups Gm1 and Gm2 positioned to ensure the continuous change of focal length between $F_{GC}$ and $F_{PC}$ and the focus of the image on the detector 1 (focus function), an image-transport group Gf2 of fixed position and of fixed magnification gf2, able to transport the pupil in the entrance space.

According to the invention, the head group Gf1, which has a large impact on the cost of the optic, is exactly dimensioned, taking into account manufacturing imperfections, so as to let pass without vignetting beams useful to the continuous GC-PC zoom under all thermal conditions. To do this, the positions of the PC and GC entrance pupils and the pupillary aberrations are constrained so as to maintain the envelope of the useful beams inside a reasonable diameter, comparable to the diameter of the PC entrance pupil. To this end, the group Gf2 generally comprises a field lens. Typically, the diameter of the head lens is over-dimensioned by about 10% to 20% with respect to the nominal diameter of the PC entrance pupil.

According to the invention, the optical device furthermore comprises a TPC configuration of preset focal length $F_{TPC}$. Starting in the PC configuration, the group Gm1 must be moved away from the group Gf1 in order to obtain the focal length $F_{TPC}$. The position of the group Gm2 is also modified, so as to maintain the focus on the detector. The continuous GC-PC zoom and the TPC configuration are optimized in a coupled way using a conventional optical-design software package.

In TPC, the abutment 51 of one of the lenses of the head group Gf1 (the lens L2 in the example of FIG. 4), plays the role of aperture diaphragm, and the useful numerical aperture is decreased with respect to that of the continuous zoom. Thus, assuming that the head lens of Gf1 is over-dimensioned by about 20% with respect to the diameter of the entrance pupil of the PC (in order to guarantee the absence of vignetting in the entirety of the GC-PC range), a useful aperture number $N_{TPC}$ is obtained that is equal to:

$N \times (F_{TPC}/F_{PC})/1.2$.

As the diameter of the envelope of the PC beams is similar to the diameter of the PC entrance pupil, the aperture diaphragm of the TPC, which is located in the head block, is naturally imaged in the vicinity of the cold diaphragm, i.e. to within + or − a few millimeters from the cold diaphragm; for example, to within less than 5 mm from the cold diaphragm.

At the end of the day, contrary to the conventional design rules of cooled IR imaging systems, in TPC configuration the system operates with a non-negligible proportion of structural flux, this having the effect of degrading the NETD. Nevertheless, as the only diaphragm liable to vignette the useful beams is close to the image of the pupil, the structural flux only exhibits low-frequency spatial variations, and hence the induced image non-uniformities may easily be compensated for using a table of pixel-gain corrections, and a limited number of tables of pixel-offset corrections.

Therefore, the net gain is very largely positive: without significant extra cost with respect to a continuous GC-PC zoom, an integrated and photometrically well-characterized TPC configuration is provided.

Two examples of imaging systems according to the invention will now be described in detail, but the following descriptional details are not intended to limit the scope of the invention. These imaging systems are based on a continuous 20° (GC)–3° (PC) zoom with a 2° TPC, suitable for an MWIR cooled detector 1 comprising 640×480 elements of a pitch of 15 μm. The cold diaphragm 3 of the open cryostat of F/3.9, is assumed to be located at about 11 mm from the focal plane in which the detector 1 is located.

In the first example, the imaging system according to the invention described with reference to FIGS. 2A, 2B and 2C, uses a zoom with two adjacent movable groups. It comprises in order along the optical axis z:

A fixed group Gf1 of focal length F1 and of telephoto type (a priori) with, for example, two lenses, one convergent lens L1 and one divergent L2 lens, mounted on a mechanical holding means 5, which means is shown in FIG. 4.

A divergent movable group Gm1 that plays the role of variator, and which works with a negative variable magnification gm1.

A convergent movable group Gm2 that plays the role of compensator, and which works with a variable magnification gm2 that is also negative.

A fixed group Gf2 that relays to the detector 1 the real intermediate image delivered by the three groups Gf1, Gm1 and Gm2. The group Gf2 works with a fixed and negative magnification gf2; in our example, it is in the vicinity of −1.5, and more generally it is comprised between −2 and −1.

The output pupil coincides with the cold diaphragm 3 of the detector 1, which plays the role of aperture diaphragm of the zoom in the continuous GC-PC range. Using a field lens 4 placed in proximity to the intermediate focal plane Pfi present in the group Gf2, it is possible to constrain the position of the entrance pupil of the PC to the vicinity of the group Gf1, in order to minimize the diameters of the components of this group, which add significantly to the overall cost of the zoom. In GC, the entrance pupil is most often virtual.

It is known that F=F1·gm1·gm2·gf2. Since the magnification gf2 is fixed, the variation in focal length is obtained by varying the product gm1 gm2, which is minimum in GC and maximum in TPC.

The assembly is optimized so that in PC, gm1·gm2 remains below about 0.85. This condition makes it possible to use the variator-compensator tandem as focal group for the entirety of the continuous GC-PC range. Specifically, the axial sensitivity of the Gm1–Gm2 tandem, which relates the defocus of the image and the axial movement of the tandem, is expressed by $[1-(gm1 \cdot gm2)^2] (gf2)^2$.

It may be deduced therefrom that if the product gm·gm2 is sufficiently far from 1.0, then a small axial movement of the tandem induces a defocus of the image; in other words, the tandem may play the role of near focal group, and may also serve to compensate for thermal drifts in the combination. Hence its interest.

In contrast, if the product gm1·gm2 is very close to 1.0, then an axial movement of the tandem Gm1–Gm2 induces practically no defocus of the image; under these conditions it is not possible to use the movable groups Gm1 and Gm2 dedicated to the zooming to focus the zoom on a nearby scene, or for athermalization.

Advantageously, the TPC configuration is obtained by going beyond the singularity at which gm1·gm2=1.0. As $F_{TPC}/F_{PC}$ is about 1.5, gm1·gm2 is then >1.2, this allowing the tandem to be used as focal group, as in the continuous GC-PC range. In the present case gm1·gm2=0.125 in GC, 0.833 in PC and 1.25 in TPC.

A second example of an imaging system according to the invention is now described with reference to FIGS. 3A, 3B and 3C, this system using a zoom with a fixed group between the two movable groups. The zoom comprises in order on the optical axis z:

A fixed group Gf1 of focal length F1 with for example a single convergent lens.

A divergent movable group Gm1 that plays the role of variator and that works with a variable and negative magnification gm1.

A convergent fixed group Gf3 that works with a variable and negative magnification gf3.

A divergent movable group Gm2 that plays the role of compensator, and that works with a variable and negative magnification gm2 of large absolute value (lower than −15, typically).

A fixed group Gf2 that relays to the detector 1 the intermediate image delivered by the four groups Gf1, Gm1, Gf3 and Gm2; Gf2 works with a constant magnification gf2 of small absolute value generally lower than 0.1, this meaning that, in the intermediate space located between the groups Gm2 and Gf2, the beams are almost collimated.

As in the preceding example, in the entirety of the continuous GC-PC range, the exit pupil coincides with the cold diaphragm of the detector, which therefore plays the role of GC-PC aperture diaphragm of the zoom. In order to minimize the diameter of the head lens (of the head group), it is possible to constrain the position of the entrance pupil of the PC to the vicinity thereof, optionally using a field lens 4 placed in the vicinity of the intermediate focal plane PFi in the re-imager Gf2. In GC, the entrance pupil is most often virtual.

The focal length F=F1·gm1·gf3·gm2·gf2. Since the magnification gf2 is constant, the variation in focal length is obtained by varying the product gm1·gf3·gm2, the absolute value of which is minimum in GC and maximum in TPC. Approximately, in the present case, |gm1·gf3·gm2|=4.0 in GC, and 40 in TPC.

Furthermore, in the GC-TPC range, gm2 varies between −17.5 and −19.4, and gf2=0.07, and hence the compensator group Gm2 may play the role of focal group. Specifically, the axial sensitivity of Gm2 is expressed by [1−(gm2)$^2$](gf2)$^2$. On account of the values of gm2 and gf2 that are in play, this sensitivity varies approximately from 1.5 to 1.8 in absolute value, which is largely compatible with an elementary movement step size of 50-micron class.

In these two examples, the aperture diaphragm of the TPC is located in the head group Gf1, which is dimensioned by the needs of the PC. As a result, the useful aperture of the TPC is decreased with respect to the continuous GC-PC zoom by a factor lower than the ratio $F_{TPC}/F_{PC}$, because the head group must let the useful beams of the continuous zoom pass without vignetting under all conditions (thermal conditions and manufacturing tolerances), this requiring the components to be slightly over-dimensioned with respect to the diameter of the PC entrance pupil. In the above two examples, the diameter of the head lens was set to 60 mm, whereas the theoretical diameter of the entrance pupil of the PC is 46.9 mm. Advantage is taken of this for the TPC, which may make use of an entrance pupil of about 57 mm, considering a reasonable margin of 1.5 mm for the ray between the edge of the lens and the useful optical zone. This margin 52 is shown in FIG. 4 between the edge of the lens L1 and the useful zone.

Lastly, the image in the detector space of this aperture diagram is located in the vicinity of the cold diaphragm of the cryostat, in order that, in TPC, only this diaphragm is liable to slightly vignette the useful beams. This condition guarantees slow spatial variations in the structural flux in TPC.

The invention claimed is:

1. A passive IR imaging system that comprises, on its optical axis:
   a matrix-array detector placed in a cryostat comprising a cold diaphragm, an optical device for forming images on the detector, having a focal length that is continuously variable between a large-field (GC) configuration of focal length $F_{GC}$ and a small-field (PC) configuration of focal length $F_{PC}$, with, in this range of focal lengths, a constant numerical aperture and an aperture diaphragm located level with the cold diaphragm of the cryostat, comprising:
   a head group of fixed position and constant focal length that comprises at least one lens mounted in a mechanical holding means, of diameter determined by the small-field (PC) configuration, a first group and second group that are movable and able to be positioned in order to ensure the change of focal length between $F_{GC}$ and $F_{PC}$ and the focus of the image on the detector, an image-transport group of fixed position and of constant magnification, able to image the aperture diaphragm in order to limit the diameter of the envelope of the small-field useful beams on the lenses of the head group,
   wherein the optical device comprises a very-small-field (TPC) configuration of preset focal length $F_{TPC}$, with the first and second movable groups positioned to obtain the focal length $F_{TPC}$, and an aperture diagram for the very-small-field (TPC) configuration embodied in the mechanical holding means of the head group such that the image in the detector space of this aperture diaphragm is located in the vicinity of the cold diaphragm of the cryostat.

2. The passive IR imaging system as claimed in claim 1, wherein the two movable groups are adjacent and in that the first movable group is divergent with a negative variable magnification, and the second movable group is convergent with a negative variable magnification.

3. The passive IR imaging system as claimed in claim 2, wherein the large-field (GC) configuration corresponds to 20°, the small-field (PC) configuration to 3°, and the very-small-field (TPC) configuration to 2°, and in that the product of the magnifications of the first and second movable groups is higher than 1.2 in very-small-field (TPC) configuration, comprised between 0.8 and 0.85 in small-field (PC) configuration and higher than 0.12 in large-field (GC) configuration.

4. The passive IR imaging system as claimed in claim 1, wherein it comprises a convergent fixed group with a negative variable magnification, located between the two movable groups which are divergent and have a negative variable magnification.

5. The passive IR imaging system as claimed in claim 4, wherein the large-field (GC) configuration corresponds to 20°, the small-field (PC) configuration to 3°, and the very-small-field (TPC) configuration to 2°, and in that the absolute value of the magnification of the image-transport group is lower than 0.1.

6. A cooled IR camera that comprises a passive IR imaging system as claimed in claim 1.

7. A pair of cooled IR binoculars that comprises a passive IR imaging system as claimed in claim 1.

* * * * *